(12) United States Patent
Lee

(10) Patent No.: US 11,099,757 B2
(45) Date of Patent: Aug. 24, 2021

(54) APPARATUS AND METHOD FOR DETERMINING CHARACTERISTICS OF MEMORY BLOCKS IN A MEMORY SYSTEM

(71) Applicant: SK hynix Inc., Icheon (KR)

(72) Inventor: Jong-Min Lee, Seoul (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/679,094

(22) Filed: Nov. 8, 2019

(65) Prior Publication Data

US 2020/0333958 A1 Oct. 22, 2020

(30) Foreign Application Priority Data

Apr. 16, 2019 (KR) .................. 10-2019-0044398

(51) Int. Cl.
*G06F 3/06* (2006.01)
*G06F 12/02* (2006.01)
*G06F 13/16* (2006.01)

(52) U.S. Cl.
CPC ............ *G06F 3/064* (2013.01); *G06F 3/0619* (2013.01); *G06F 3/0631* (2013.01); *G06F 3/0652* (2013.01); *G06F 3/0679* (2013.01); *G06F 12/0246* (2013.01); *G06F 13/1668* (2013.01); *G06F 2212/7211* (2013.01)

(58) Field of Classification Search
None
See application file for complete search history.

(56) References Cited

U.S. PATENT DOCUMENTS

| 8,612,804 B1 * | 12/2013 | Kang ................. G11C 16/349 714/42 |
| 9,710,176 B1 * | 7/2017 | Tang .................. G06F 12/0246 |
| 2010/0115186 A1 | 5/2010 | Chang et al. |
| 2010/0174845 A1 * | 7/2010 | Gorobets ............ G06F 12/0246 711/103 |
| 2013/0304965 A1 * | 11/2013 | Yeh ...................... G06F 3/0688 711/103 |
| 2020/0210104 A1 * | 7/2020 | Grosz ..................... G06F 3/061 |

FOREIGN PATENT DOCUMENTS

KR 20150042931 A 4/2015

* cited by examiner

*Primary Examiner* — Kevin Verbrugge

(57) ABSTRACT

A memory system includes a memory device including a plurality of memory blocks capable of storing data, and a controller configured to determine an attribute of data stored in a memory block during an operating period. A duration of the operating period is changeable based on a parameter regarding the plurality of memory blocks. The duration of the operating period is adjusted in order to increase the accuracy of a determination of a usage pattern regarding the memory device.

20 Claims, 7 Drawing Sheets

FIG. 9

| BLK(#) | R.C. |
|---|---|
| BLK1 | 158 |
| BLK2 | 5 |
| ⋮ | ⋮ |
| BLK(K-1) | 0 |
| BLK(K) | 12 |
| TOTAL | 1380 |

BLK1 — HOT

1$^{ST}$ CASE

| BLK(#) | R.C. |
|---|---|
| BLK1 | 158 |
| BLK2 | 5 |
| ⋮ | ⋮ |
| BLK(K-1) | 260 |
| BLK(K) | 12 |
| TOTAL | 2580 |

BLK1 — COLD
BLK(K-1) — HOT

2$^{ND}$ CASE

APPARATUS AND METHOD FOR DETERMINING CHARACTERISTICS OF MEMORY BLOCKS IN A MEMORY SYSTEM

CROSS-REFERENCE TO RELATED APPLICATIONS

This patent application claims priority under 35 U.S.C. § 119(a) to Korean Patent Application No. 10-2019-0044398, filed on Apr. 16, 2019, the entire disclosure of which is incorporated herein by reference.

TECHNICAL FIELD

Various embodiments generally relate to a memory system, and more particularly, to a method and an apparatus for determining and utilizing an attribute of data stored in a plurality of memory blocks included in a memory system.

BACKGROUND

Recently, a paradigm for a computing environment has shifted to ubiquitous computing, which enables computer systems to be accessed anytime and everywhere. As a result, the use of portable electronic devices, such as mobile phones, digital cameras, notebook computers and the like, is rapidly increasing. Such portable electronic devices typically use or include a memory system that uses or embeds at least one memory device, i.e., a data storage device. The data storage device can be used as a main storage device or an auxiliary storage device of a portable electronic device.

A data storage device using a nonvolatile semiconductor memory device is advantageous, as compared to a hard disk, in that it has excellent stability and durability because it has no mechanical moving parts (e.g., a mechanical arm), and has high data access speed and low power consumption. In the context of a memory system having such advantages, an illustrative data storage devices include a USB (Universal Serial Bus) memory device, a memory card having various interfaces, a solid state drive (SSD), or the like.

BRIEF DESCRIPTION OF THE DRAWINGS

The description herein makes reference to the accompanying drawings wherein like reference numerals refer to like parts throughout the figures, and wherein:

FIG. 9 illustrates a threshold or a criterion for determining whether an attribute of data stored in a memory block, and in particular whether the data is hot or cold, according to an embodiment of the disclosure.

DETAILED DESCRIPTION

Figure 1:
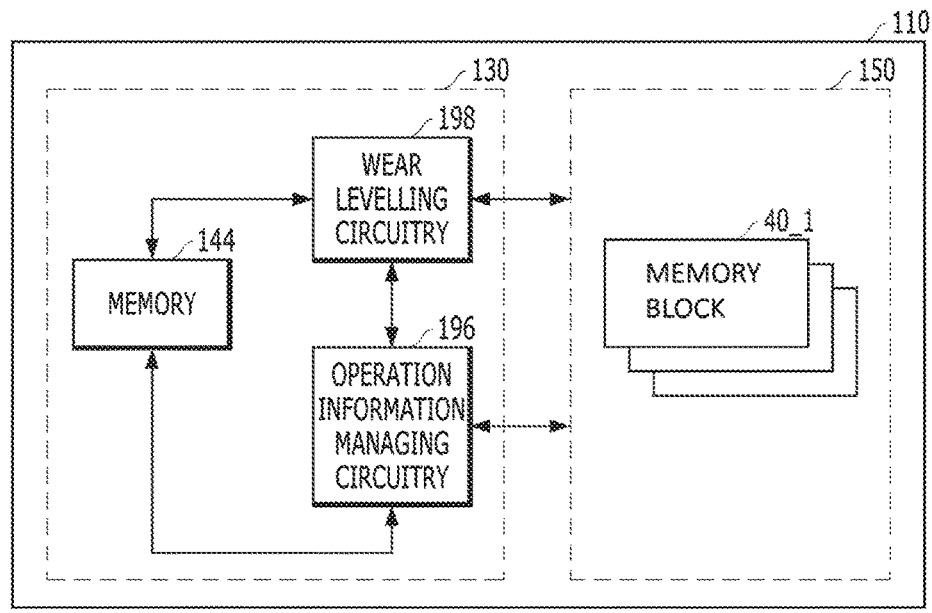
FIG. 1 illustrates a memory system according to an embodiment of the disclosure.

Various embodiments of the disclosure are described below in with reference to the accompanying drawings. Elements and features of the disclosure, however, may be configured or arranged differently to form other embodiments, which may be variations of any of the disclosed embodiments. Thus, the present teachings are not limited to the embodiments set forth herein. Rather, the described embodiments are provided so that this disclosure is thorough and complete and fully conveys the scope of the disclosure to those skilled in the art to which the present teachings pertain. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without departing from the spirit and scope of the present teachings.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting. As used herein, singular forms are intended to include the plural forms and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the disclosure. The teachings disclosed herein may be practiced without some or all of these specific details. In other instances, well-known process structures and/or processes have not been described in detail in order not to unnecessarily obscure the teachings disclosed herein.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure can provide a memory system, a data processing system, and an operation process or a method, which can quickly and reliably process data in a memory device by reducing operational complexity and performance degradation of the memory system, and which can enhance usage efficiency of the memory device.

The disclosure provides methods and apparatuses for dynamically determining or changing a time point for determining an attribute of data stored in a plurality of memory blocks in a memory system and dynamically determining a criterion or a threshold for determining the attribute of data stored in the plurality of memory blocks, so as to more accurately determine the attribute of data stored in the plurality of memory blocks and improve performance of the memory system.

In addition, the disclosure provides methods and apparatuses for determining an attribute of data stored in a plurality of memory blocks in a memory system and clarifying a threshold or a criterion indicating whether a wear levelling operation is to be performed on the plurality of memory blocks so that an unnecessary operation may be avoided, thereby improving the performance of the memory system.

Further, the disclosure provides methods and apparatuses for performing a wear leveling operation on a plurality of memory blocks based on an attribute of data stored in the plurality of memory blocks in the memory system, thereby controlling a lifespan of the memory system based on user's data usage pattern or access pattern on the memory system.

In an embodiment, a memory system can include a memory device including a plurality of memory blocks capable of storing data; and a controller configured to determine an attribute of data stored in a memory block during an operating period which is changeable based on a first parameter regarding the plural memory blocks.

By the way of example but not limitation, the controller can be configured to perform a wear levelling operation on the plural memory blocks, based on the attribute of data stored in the memory block.

The controller can be configured to allocate a first memory block previously storing data which is determined to have a hot attribute among the plurality of memory blocks for programming with another data which is determined to have a cold attribute after the first memory block is erased, and allocate a second memory block previously storing data which is determined to have a cold attribute among the plurality of memory blocks for programming another data which is determined to have a hot attribute after the second memory block is erased.

The controller can be configured to determine the attribute of data stored in each memory block, and estimate a data usage pattern by associating the attribute of data stored in the memory block with a logical address regarding a piece of data stored in the memory block.

The controller can be configured to determine which memory block to allocate for newly programming a piece of data associated with the logical address based on the data usage pattern.

The controller can be configured to check a ratio of memory blocks having a changed erase count among the plural memory blocks when a change of a total erase count reaches a preset value, adjust the preset value based on the ratio, and determine, based on the preset value, the operating period used to determine the attribute of the data.

The controller may be configured to increase the preset value when the ratio is in a first range.

The controller may be configured to decrease the preset value when the ratio is in a second range.

The controller may be configured to determine the attribute of data stored in the memory block based on a change of a read count included in the parameter regarding the memory block.

The controller may be configured to adjust a threshold for determining the attribute of data stored in the memory block based on a total of changes of read counts regarding the plurality of memory blocks.

In another embodiment, a method for operating a memory system may include performing at least one operation of a program operation, a read operation or an erase operation on a memory block among a plurality of memory blocks; updating a first parameter regarding the plurality of memory blocks and a second parameter regarding the memory block, in response to the at least one operation performed on the memory block; determining an operating period based on the first parameter and the second parameter; and determining an attribute of data, stored in the memory block during the operating period, based on the second parameter.

The method can further include performing a wear levelling operation on the plurality of memory blocks based on the attribute of data stored in the memory block.

The wear levelling operation can include allocating a first memory block previously storing data which is determined to have a hot attribute among the plural memory blocks for programming another data which is determined to have a cold attribute, after the first memory block is erased, and allocating a second memory block previously storing data which is determined to have a cold attribute among the plural memory blocks for programming another data which is determined to have a hot attribute, after the second memory block is erased.

The attribute of data can be determined in each memory block. The method can further include estimating a data usage pattern through associating the attribute of data stored in the memory block with a logical address regarding a piece of data stored in the memory block.

The method can further include determining which memory block is allocated for newly programming a piece of data associated with the logical address based on the data usage pattern.

The method can further include checking a ratio of memory blocks having a changed erase count among the plural memory blocks when a change of a total erase count reaches a preset value; adjusting the preset value based on the ratio; and determining the operating period based on the preset value.

By the way of example but not limitation, the preset value may be increased when the ratio is in a first range.

The preset value may be decreased when the ratio is in a second range.

Determining the attribute of data can include determine the attribute of data stored in the memory block based on a change of a read count included in the parameter regarding the memory block.

Determining the attribute of data can further include adjusting a threshold for determining the attribute of data stored in the memory block based on a total of changes of read counts regarding the plural memory blocks.

Embodiments of the disclosure will now be described with reference to the accompanying drawings, wherein like numbers reference like elements.

FIG. 1 illustrates a memory system 110 according to an embodiment of the disclosure. For example, a memory system 110 may be mounted on a computing device or a mobile device and then transmit, or receive, a piece of data, a command or an instruction or a response to, or from, a host 102 (see FIGS. 2 and 3) which is operatively engaged with the memory system 110.

The memory system 110 includes a controller 130 and a memory device 150. The controller 130 outputs a piece of data delivered from the memory device 150 in response to a request of the host 102, or stores a piece of data transferred from the host 102 in the memory device 150. The memory device 150 may include a plurality of memory blocks, each including a plurality of pages, each page including a plurality of cells capable of storing data. Herein, the internal configuration of the memory device 150 may differ depending on characteristics of the memory device 150, the purpose for which the memory system 110 is used, or a specification of the memory system 110 required by the host 102. By the way of example but not limitation, a plurality of cells in the memory block may be erased together by an erase operation. A plurality of cells of the page can be programmed together by a program operation.

The controller 130 may include a memory 144 that may store various types of data, operation information, information parameters, and the like, which are associated with or generated by an operation performed in the memory system 110. In FIG. 1, the memory 114 is described as a component included in the controller 130, but may be implemented as a separate component physically separated from the controller 130. According to an embodiment, the controller 130 may divide the memory 144 into a plurality of areas, and allocate each of the plurality of areas for storing different types of data, information, and parameters.

The controller 130 may include at least one of wear levelling circuitry 198 or operation information managing circuitry 196. The operation information managing circuitry 196 may check, update, adjust, and control operation information, state information, parameter information, and the like which are associated with a plurality of memory blocks 40_1 included in the memory device 150. For example, when the controller 130 performs an erase operation on a specific memory block in the memory device 150, the operation information managing circuitry 196 can increase an erase count regarding the corresponding memory block by a preset value (e.g., 1, 2, 0.5, or etc.).

As used in the disclosure, the term 'circuitry' can refer to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to a particular claim element, an integrated circuit for a storage device.

In addition to the above-described erasing operation, after a read operation of reading data stored in the memory block or a program operation of programming data in the memory block is performed, the operation information managing circuitry 196 may modify or update data, information, a parameter or etc. of the memory block associated with the performed operation. For example, the operation information managing circuitry 196 may increment a read count of a memory block each time data is read from the memory block, and may increment a program count of the memory block each time a page of the memory block is programmed.

In addition, the operation information managing circuitry 196 may not only update, manage and control operation information, state information, information parameters, etc. related to the plurality of memory blocks 40_1 in the memory device 150, but also determine an attribute of data stored in the plurality of memory blocks 40_1. By the way of example but not limitation, when a frequency of accessing a piece of data stored in a specific memory block is higher than a preset value, the operation information managing circuitry 196 may determine the attribute of data stored in the memory block as 'hot.' On the other hand, when the frequency of accessing data stored in the memory block is equal to, or lower than, the preset value, the operation information managing circuitry 196 may determine the attribute of data stored in the memory block as 'cold.'

As a method of determining the attribute of data, the operation information managing circuitry 196 may use the number of times data stored in a memory block is read during a preset operating period (e.g., 1 day, 1 month, etc.). However, the number of data read operations in a specific memory block may vary greatly according to user's data usage pattern during the preset operation period. For example, during an operating period of one week, the memory system 110 may perform 10 read operations or hundreds of thousands of read operations according to requests of a user or a host. When the duration of the operating period is fixed, it may be inaccurate or unnecessary to determine attributes of data stored in the plurality of memory blocks 40_1 included in the memory device 150 because of a large difference in the number of operations performed in response to requests of a user or a host. Thus, in an embodiment of the disclosure, the duration of the operating period for checking or determining the attribute of data stored in the memory block may be dynamically changed or adjusted according to the use of the memory system 110, specifically, according to operational states of the plurality of memory blocks 40_1 in the memory device 150.

In an embodiment of the disclosure, the operation information managing circuitry 196 may determine the operating period depending on whether a total change amount of erase counts associated with the plurality of memory blocks 40_1 in the memory device 150 reaches a preset value. For example, it is assumed that an erase count of a specific memory block may be increased by '1' whenever an erase operation is performed in the specific memory block among the plurality of memory blocks 40_1. When the erase operations are performed 100 times on the plurality of memory blocks 40_1 in the memory device 150, the total change amount of the erase counts associated with the plurality of memory blocks 40_1 may be increased by 100. When the above-described preset value is 100, the operating period may end when 100 erase operations are performed on the plurality of memory blocks 40_1 during the operating period. According to an embodiment, the above-described preset value may be determined according to the number of memory blocks 40_1 included in the memory device 150. When the operating period can be determined based on the total change amount of the erase counts, the operating period may be determined based on a data usage pattern, e.g., the usage of the memory system 110 in response to requests of the user or the host.

According to an embodiment, in addition to determining the total change amount of the erase counts regarding the memory blocks 40_1, the operation information managing circuitry 196 may also determine the number of erased memory blocks among the plurality of memory blocks 40_1 in an operating period in order to determine whether to extend the operating period. For example, when the total change amount of the erase counts regarding memory blocks 40_1 is increased by 100, the operation information managing circuitry 196 may determine how many of the memory blocks 40_1 have had erase operations performed on them in the operating period. That is, the operation information managing circuitry 196 may determine the number of memory blocks which have a change of erase count (that is, the erase count is increased) among the plurality of memory blocks 40_1.

For example, if 100 (total) erase operations have been performed in 100 memory blocks of the memory system, such that exactly one erase operation has been performed in each of 100 memory blocks, it may not make much sense to check a data usage pattern or determine the attribute of data stored in the 100 memory blocks based on operations such as a read, a program, an erase operation or etc. performed thereon during the operating period in which the 100 erase operations were performed. It could be presumed that, when the erase operation occurs once in each of 100 memory blocks, a plurality of pieces of data stored in the plurality of memory blocks 40_1 (i.e., in the 100 erased memory blocks) in the memory device 150 have been erased sequentially. When the erase operations are sequentially performed on the plurality of memory blocks 40_1, an operation for wear levelling or garbage collection, which extends a lifespan of the memory device 150 or improves its operational efficiency, may be unnecessary because the plurality of memory blocks 40_1 may each have substantially the same number of program/erase (P/E) cycles, which can be considered an indicator for a lifespan or a wear-out of memory block. In this case, the operating period may be extended to another timing point at which 200 erase operations instead of the 100 erase operations have been performed. That is, a preset value or a preset condition may be increased from 100 to 200 based on an operational state of the memory device 150.

According to an embodiment, the step of adjusting a preset value or a preset condition for determining an operating period may be determined based on a first ratio of the number of memory blocks on which the erase operation has been performed in the operating period to the preset value or the preset condition. For example, if the preset value is 100 and the number of memory blocks on which the erase operation was performed is 91, the first ratio may be 91%.

If the first ratio is greater than or equal to a preset threshold (e.g., 90%), the preset value or the preset condition may be adjusted (e.g., increased from 100 to 150, 200, or 300). When the preset value or the preset condition is increased so that more read, program and erase operations are performed on the plurality of memory blocks, there is a chance that the first ratio may be less than the preset threshold (e.g., 90%) when the total change amount of the erase counts reaches the increased value.

In an embodiment, there may be a plurality of preset thresholds establishing a plurality of ranges. For example, according to which range among the plurality of ranges the first ratio belongs to, the preset value or the preset condition may be differently increased. By the way of example but not limitation, when the first ratio falls within a first range (e.g., 90 to 100%), the preset value or the preset condition may be doubled (e.g., from 100 to 200). When the first ratio falls within a second range (e.g., 70 to 90%), the preset value or the preset condition may be increased one and half times (e.g., from 100 to 150).

Meanwhile, according to another embodiment, the step of adjusting a preset condition or a preset value for determining an operating period may be determined as a second ratio of the number of memory blocks on which an erase operation was performed to a total number of the plurality of memory blocks 40_1. When the total number of the plurality of memory blocks 40_1 is 500 and the number of the memory blocks on which the erase operation is performed is 50, the second ratio may be 10%. When the preset condition or the preset value are reached and the second ratio is less than or equal to a preset threshold (e.g., 15%), the preset condition or the preset value may be increased.

According to an embodiment, there may be a plurality of preset thresholds establishing a plurality of ranges. For example, according to which range among the a plurality of ranges the second ratio belongs to, the preset value or the preset condition may be differently increased. By the way of example but not limitation, when the second ratio belongs to a first range (e.g., 0 to 15%), the preset value or the preset condition may be increased three times (e.g., from 100 to 300). When the second ratio falls within a second range (e.g., 15 to 30%), the preset value or the preset condition may be doubled (e.g., from 100 to 200).

As described above, the operation information managing circuitry 196 may determine an operating period as a reference for checking an attribute of data stored in the plurality of memory blocks 40_1 of the memory device 150, based on operations performed in the memory system 110 or a data usage pattern of the memory system 110 associated with requests of a user or a host. In this way, the attribute (e.g., hot or cold depending on an access frequency) of the data stored in the plurality of memory blocks 40_1 of the memory device 150 may be more clearly or accurately determined according to the data usage pattern in a changeable operation period. For example, based on an amount of change in a read count corresponding to each memory block during the changeable operation period, data stored in a memory block that is more frequently accessed than a threshold may be determined to have a hot attribute. It may be determined that data stored in another memory block that is less frequently accessed than the threshold may have a cold attribute.

The controller 130 may include the wear levelling circuitry 198 that may perform a wear leveling operation based on the attribute of data stored in a memory block, which is determined by the operation information managing circuitry 196. Because the operation information managing circuitry 196 may determine the attribute of data stored in each of the plurality of memory blocks 40_1 in the memory device 150, the wear levelling circuitry 198 may associate the attribute of the data stored in each of the plurality of memory blocks 40_1 with the attribute of a piece of data matched with a logical address. Data attribute, such as hot or cold, can be associated with a logical address indicating a piece of data stored in the corresponding memory block. For the wear levelling operation, the wear levelling circuitry 198 may allocate a specific memory block in which data having a cold attribute is previously stored for newly programming a piece of data matched with a logical address associated with a hot attribute, after erasing the specific memory block. A memory block in which cold data (data having a cold attribute) has been stored may include a memory block having little change of a program/erase (P/E) count among the plurality of memory blocks 40_1. In contrast, the wear levelling circuitry 198 may allocate a memory block in which hot data (data having a hot attribute) has been stored for a logical address indicating a piece of cold data. A memory block in which hot data has been stored may include a memory block having a lot change of a program/erase (P/E) count among the plurality of memory blocks 40_1.

When the operating period is determined by the operation information managing circuitry 196, the wear levelling circuitry 198 may perform a wear levelling operation based on operations performed in the memory device 150 during the operating period. The operations performed during the operating period may be reflected in operation information, information parameters or etc. regarding the plurality of memory blocks 40_1 in the memory device 150. Herein, the operating period is changeable. The operating period can be determined based on the operation information, information parameters or etc. regarding the plurality of memory blocks 40_1. Further, an attribute of data stored in a memory block may be determined based on the operation information, information parameters or etc. regarding the plurality of memory blocks 40_1. The wear levelling operation may be also performed based on the attribute of data stored in the memory block.

Hereinafter, various embodiments of the disclosure will be described in more detail with reference to FIGS. 2 to 9.

Figure 2:
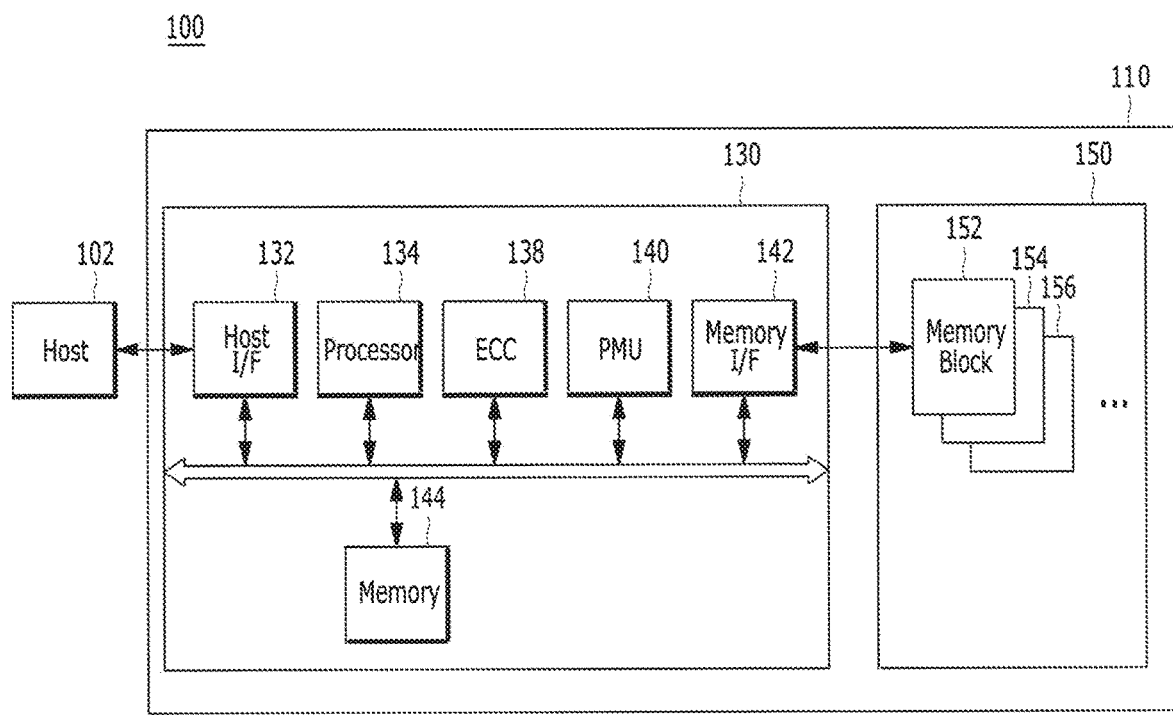
FIG. 2 illustrates an example of a data processing system including a memory system according to an embodiment of the disclosure.

FIG. 2 illustrates a data processing system 100 in accordance with an embodiment of the disclosure. The data processing system 100 may include a host 102 engaged or interlocked with a memory system 110.

The host 102 may include, for example, a portable electronic device such as a mobile phone, an MP3 player and a laptop computer or an electronic device such as a desktop computer, a game player, a television (TV), a projector and the like.

The host 102 includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or user's environment. Personal operating system, such as the Microsoft Windows® and Google Chrome OS™ operating systems, may be subject to support services for general purposes. Enterprise operating systems, such as the Microsoft Windows server, Linux®, Unix® operating systems and the like, can be specialized for securing and supporting high performance. Mobile operating systems, such as an Android™, an iOS®, or a Windows mobile operating system, may be subject to support services or functions for mobility (e.g., a power saving function). The host 102 may include a plurality of operating systems. The host 102 may execute multiple operating systems interlocked with the memory system 110, corresponding to a user's request. The host 102 may transmits a plurality of commands corresponding to the user's requests into the memory system 110, thereby performing operations corresponding to commands within the memory system 110.

The memory system 110 may perform a specific function or operation in response to a request from the host 102 and, in particular, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in the various types of memory systems described above.

By way of example but not limitation, the controller 130 and the memory device 150 may be integrated into a single semiconductor device. The controller 130 and memory device 150 configuring an SSD may be integrated into a single semiconductor device, for improving an operation speed. When the memory system 110 is used as an SSD, the operating speed of the host 102 connected to the memory system 110 can be improved more than that of the host 102 implemented with a hard disk. In addition, the controller 130 and the memory device 150 integrated into one semiconductor device may form a memory card. For example, a PC card (PCMCIA), a compact flash card (CF), a memory card such as a smart media card (SM, SMC), a memory sticks, a multimedia card (MMC, RS-MMC, MMCmicro), a SD card (SD, miniSD, microSD, SDHC), a universal flash memory and the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks including memory blocks 152, 154, and 156. Each of the memory blocks 152, 154, and 156 may include a plurality of pages. Each of the plurality of pages may include a plurality of memory cells to which a plurality of word lines (WL) are electrically coupled. The memory device 150 also includes a plurality of memory dies each of which includes a plurality of planes, each of which includes a plurality of memory blocks. In addition, the memory device 150 may be a non-volatile memory device, for example a flash memory, wherein the flash memory may be a three-dimensional stack structure.

The controller 130 may control overall operations of the memory device 150, such as read, write, program, and erase operations. For example, the controller 130 may control the memory device 150 in response to a request from the host 102. The controller 130 may provide the data read from the memory device 150 to the host 102. The controller 130 may store the data provided by the host 102 into the memory device 150.

The controller 130 may include a host interface (I/F) 132, a processor 134, an error correction circuit (ECC) 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface unit 132 is a component for exchanging data with the host 102, which may be implemented through a firmware called a host interface layer (HIL).

The ECC 138 can correct erroneous bits in the data to be processed in (e.g., outputted from) the memory device 150. The ECC 138 may include an ECC encoder and an ECC decoder. Here, the ECC encoder can perform error correction encoding of data to be programmed into the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC 138 can determine whether the error correction decoding has succeeded and output an instruction signal (e.g., a correction success signal or a correction fail signal). The ECC 138 can use the parity bit which is generated during the ECC encoding process to correct the erroneous bit of the read data. When the number of the erroneous bits is greater than or equal to a threshold number of correctable error bits, the ECC 138 may not correct erroneous bits but may output an error correction fail signal indicating failure in correcting the erroneous bits.

The ECC 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC 138 may include all or some of circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface unit 142 can provide an interface for handling commands and data between the controller 130 and the memory device 150, for example, operations of NAND flash interface, in particular, operations between the controller 130 and the memory device 150. In accordance with an embodiment, the memory interface unit 142 can be implemented through firmware called a Flash Interface Layer (FIL) as a component for exchanging data with the memory device 150.

The memory 144 may support operations performed by the memory system 110 and the controller 130. The memory 144 may store temporary or transactional data for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data required for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 illustrates the second memory 144 disposed within the controller 130, the embodiment is not limited thereto. That is, the memory 144 may be located inside or outside the controller 130. For instance, the memory 144 may be embodied by an external volatile memory having a memory interface transferring data and/or signals transferred between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware stored in a non-transitory computer-readable media to control the overall operations of the memory system 110. Herein, the firmware may be referred to as a flash translation layer (FTL). The FTL may operate as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may look like a general storage device for performing read or write operations because of the address mapping operation. Also, due to a characteristic of a flash memory device, when the controller 130 operates to update data stored in a particular page, the controller 130 may, through the address mapping operation based on the map data, program the updated data on another (empty) page and then invalidate the old data of the particular page (e.g., update a physical address, corresponding to a logical address of the updated data, from the previous particular page to the another (newly programed) page). Further, the controller 130 may store map data of the new data into the FTL.

For example, when performing an operation requested by the host 102 on the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command and a parameter set operation corresponding to a set parameter command or a set feature command with a set command.

The controller 130 may also perform a background operation on the memory device 150 using the processor 134. By way of example but not limitation, the background operation for the memory device 150 includes an operation (e.g., a garbage collection (GC) operation) for copying and storing data stored in an arbitrary memory block among the memory blocks 152, 154, and 156 in the memory device 150 to another arbitrary memory block. The background operation can include an operation (e.g., a wear leveling (WL) operation) to move or swap between data stored in at least one of the memory blocks 152, 154, and 156 in memory device 150 to at least another of the memory blocks 152, 154, and 156. As a background operation, the controller 130 uses the processor 134 to store the map data stored in the controller 130 to at least one of the memory blocks 152, 154, and 156 in the memory device 150, e.g., a map flush operation. A bad block management operation for checking bad blocks in the plurality of memory blocks 152, 154, and 156 included in the memory device 150 is another example of a background operation performed by the processor 134.

In accordance with an embodiment, the controller 130 and the second memory 144 shown in FIG. 1 may be implemented through at least one processor 134 and at least one memory 144 in the controller 130 described in FIG. 2.

In the memory system 110, the controller 130 performs a plurality of command operations corresponding to a plurality of commands received from the host 102. For example, when performing a plurality of program operations corresponding to plural program commands, a plurality of read operations corresponding to plural read commands and a plurality of erase operations corresponding to plural erase commands sequentially, randomly, or alternatively, the controller 130 can determine which channel(s) or way(s) in a plurality of channels (or ways) connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine each channel or each way as one of a busy state, a ready state, an active state, an idle state, a normal state and/or an abnormal state. Controller's determination of which channel or way an instruction (and/or a data) is delivered through can be associated with a physical block address, e.g., which die(s) the instruction (and/or the data) is delivered to. The controller 130 can refer to descriptors delivered from the memory device 150. The descriptors can include a block or page of parameters that describe something about the memory device 150, which is a data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks included in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
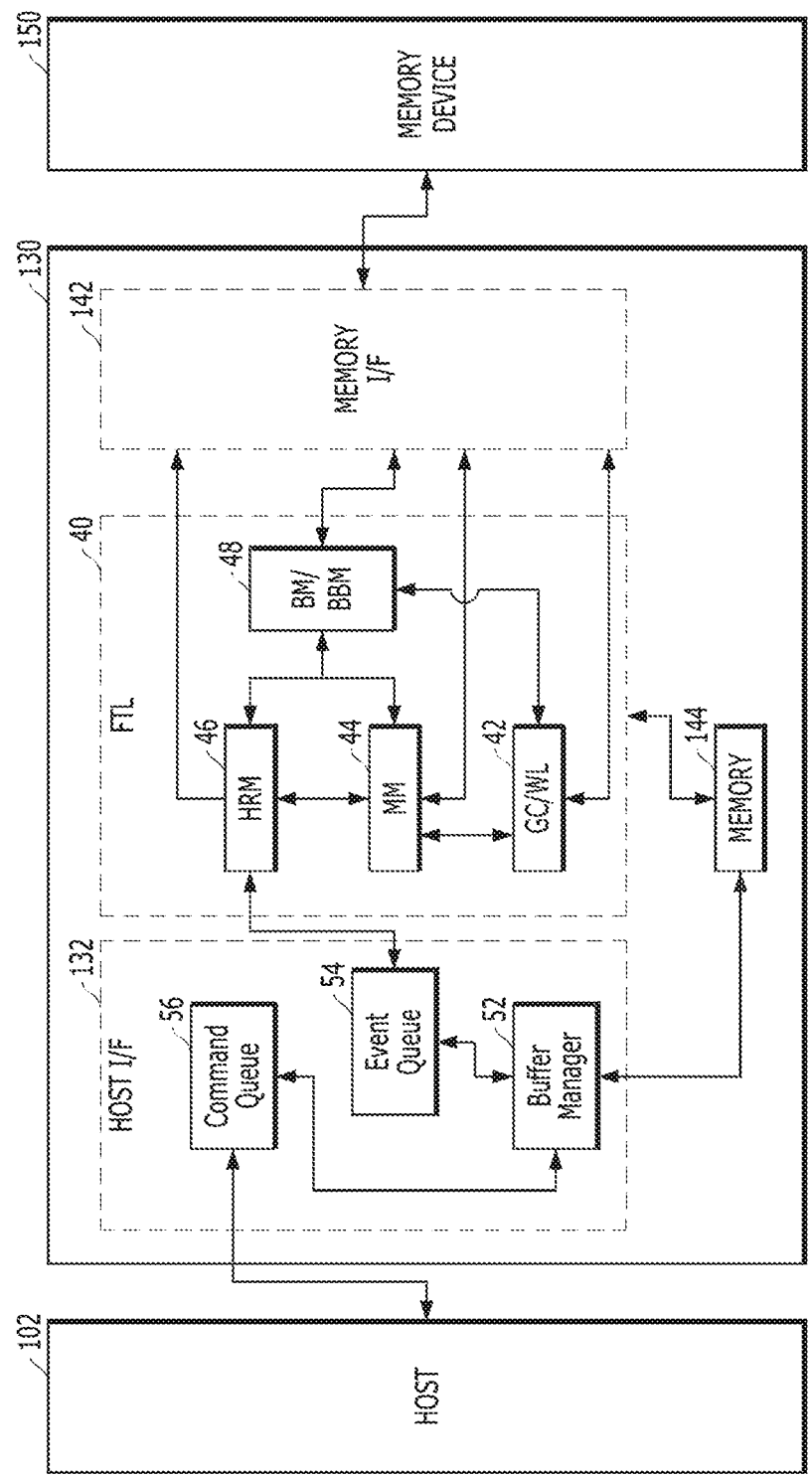
FIG. 3 illustrates a controller in a memory system according to an embodiment of the disclosure.

Referring to FIG. 3, a controller 130 in a memory system in accordance with another embodiment of the disclosure is described in detail. The controller 130 cooperates with the host 102 and the memory device 150. The controller 130 can include a host interface unit 132, a flash translation layer (FTL) unit 40, a memory interface unit 142 and a memory 144.

Although not shown in FIG. 3, in accordance with an embodiment, the ECC 138 described in FIG. 2 may be included in the flash translation layer (FTL) unit 40. In another embodiment, the ECC 138 may be implemented as a separate module, a circuit, firmware stored in a non-transitory computer-readable media and executed by a processor, or the like, which is included in, or associated with, the controller 130.

The host interface unit 132 is for handling commands, data, and the like transmitted from the host 102. By way of example but not limitation, the host interface unit 132 can include a command queue 56, a buffer manager 52 and an event queue 54. The command queue 56 can sequentially store commands, data, and the like transmitted from the host 102 and output them to the buffer manager 52 in a stored order. The buffer manager 52 can classify, manage or adjust the commands, the data, and the like, which are delivered from the command queue 56. The event queue 54 can sequentially transmit events for processing the commands, the data, and the like transmitted from the buffer manager 52.

A plurality of commands or data of the same characteristic may be continuously transmitted from the host 102, or commands and data of different characteristics may be transmitted to the memory system 110 after being mixed or jumbled. For example, a plurality of commands for reading data (read commands) may be delivered, or commands for reading data (read command) and programming/writing data (write command) may be alternately transmitted to the memory system 110. The host interface unit 132 can store commands, data, and the like, which are transmitted from the host 102, to the command queue 56 sequentially. Thereafter, the host interface unit 132 can estimate or predict what type of operation the controller 130 will perform according to the characteristics of the command, data, etc., which is transmitted from the host 102. The host interface unit 132 can determine a processing order and a priority of commands, data and the like, based at least on their characteristics. According to characteristics of commands, data, and the like transmitted from the host 102, the buffer manager 52 in the host interface unit 132 is configured to determine whether commands, data, and the like are stored in the memory 144, or whether the commands, the data, and the like are delivered into the flash translation layer (FTL) unit 40. The event queue 54 receives events, entered from the buffer manager 52, which are to be internally executed and processed by the memory system 110 or the controller 130 in response to the commands, the data, etc., transmitted from the host 102, so as to deliver the events into the flash translation layer (FTL) unit 40 in the order received.

In accordance with an embodiment, the flash translation layer (FTL) unit 40 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection or wear leveling. By the way of example but not limitation, the state manager 42 may include the wear levelling circuitry 198 shown in FIG. 1. The block manager 48 can execute commands or instructions onto a block in the memory device 150.

By way of example but not limitation, the host request manager (HRM) 46 can use the map manager (MM) 44 and the block manager 48 to handle or process requests according to the read and program commands and events which are delivered from the host interface unit 132. The host request manager (HRM) 46 can send an inquiry request to the map data manager (MM) 44, to figure out a physical address corresponding to the logical address which is entered with the events. The host request manager (HRM) 46 can send a read request with the physical address to the memory interface unit 142, to process the read request (handle the events). On the other hand, the host request manager (HRM) 46 can send a program request (write request) to the block manager 48, to program entered data to a specific unrecorded page (i.e., a page having no data programmed into it since the last time the block that includes the page was erased) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface unit 142. It can be plausible that the block manager 48 sends several flash program requests to the memory interface unit 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the smallest number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine the validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface unit 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 may not perform the mapping table update. It is because the map request is issued with old physical information if the status manger 42 requests a map update, then a valid page copy is completed later. The map manager 44 may perform a map update operation to ensure accuracy only if the latest map table still points to the old physical address.

The memory device 150 can include a plurality of memory blocks. The plurality of memory blocks can be classified into different types of memory blocks such as a single level cell (SLC) memory block, a multi-level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity in the same space than the SLC memory block. The MLC memory block can be highly integrated in a view of storage capacity. In an embodiment, the memory device 150 may be implemented with MLC memory blocks such as an MLC memory block, a triple level cell (TLC) memory block, a quadruple level cell (QLC) memory block, or a combination thereof. The MLC memory block may include a plurality of pages implemented by memory cells each capable of storing 2-bit data. The triple level cell (TLC) memory block may include a plurality of pages implemented by memory cells each capable of storing 3-bit data. The quadruple level cell (QLC) memory block can include a plurality of pages implemented by memory cells each capable of storing 4-bit data. In another embodiment, the memory device 150 can be implemented with a block including a plurality of pages implemented by memory cells each capable of storing 5-bit or more bit data.

In an embodiment of the disclosure, the memory device 150 is embodied as a nonvolatile memory such as a flash memory such as a NAND flash memory, a NOR flash memory and the like. In other embodiments, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 4:
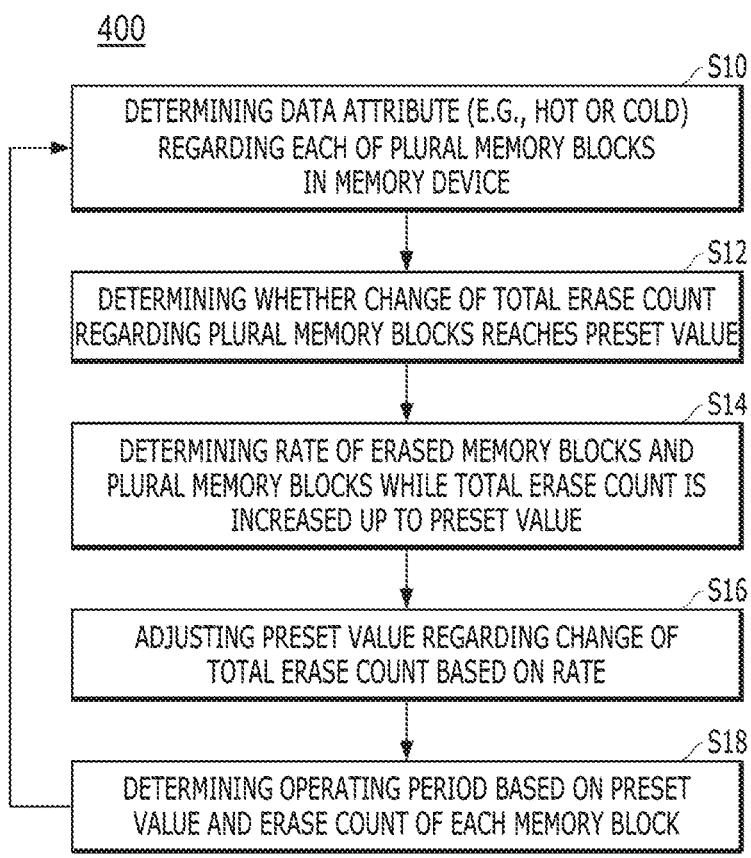
FIG. 4 illustrate a first process of a memory system according to an embodiment of the disclosure.

FIG. 4 illustrate a first process 400 of a memory system according to an embodiment of the disclosure. In detail, the first process 400 determines an operating period that is used to determine an attribute of data stored in a plurality of memory blocks included in a memory device of the memory system.

The first process 400 may include determining a data attribute of, for example, hot or cold on a block-by-block basis for a plurality of memory blocks in a memory device (S10). Determining the data attribute of hot or cold (S10) may not be performed at the beginning when the memory device 150 is first placed in use. However, after the memory device 150 has been in use for a certain period, the data attribute of hot or cold can be determined. Determining attributes or characteristics of data stored in the plurality of memory blocks in the memory device 150 may be performed based on operations performed in the memory device 150 during an operating period. Further, determining the attributes or the characteristics of the data stored in the plurality of memory blocks in the memory device 150 may include a step of starting another operating period.

The first process 400 may include determining whether a change of a total erase count regarding a plurality of memory blocks in a memory device has reached a preset value (S12), determining a ratio of erased memory blocks of the plurality of memory blocks when the total erase count has increased up to the preset value (S14), adjusting the preset value regarding the change of total erase count based on the ratio of erased memory blocks of the plurality of memory blocks (S16), and determining an operation period based on the preset value and an erase count of each memory block (S18). After a new operating period starts, one or more read, program, erase operations or the like may be performed in the memory device. Information parameters regarding a plurality of memory blocks in the memory device may be generated and updated in response to an operation performed on the plurality of memory blocks. For example, a controller may monitor the change of erase counts regarding the plurality of memory blocks in the memory device. The total of the erase counts for the plurality of memory blocks may be the sum of the erase counts respectively associated with each of the plurality of memory blocks.

For example, when a total erase count regarding the plurality of memory blocks has changed by 100 since the start of the operation period, this may indicate that 100 erase operations have been performed on the plurality of memory blocks since the start of the operation period. If, for example, a preset value is 100, the controller may determine that the change of the total erase count has reached the preset value. In response to the change of the total erase count reaching the preset value, how many memory blocks an erase operation has been performed on among the plurality of memory blocks may be checked. Herein, the change of the total erase count may show how many erase operations have been performed during an operating period on the plurality of memory blocks. Further, because each erase count may correspond to each memory block, how many erase counts are changed may show the number of memory blocks on which at least one erase operation has been performed (i.e., the number of erased memory blocks) since the beginning of the operation period. The controller may calculate the ratio of erased memory blocks of the plurality of memory blocks (S14). Here, the ratio may be the first ratio (the number of erased memory blocks divided by the preset value) or the second ratio (the number of erased memory blocks divided by the total number of memory blocks in the plurality of memory blocks) described with reference to FIG. 1, but embodiments are not limited thereto.

Based on the calculated ratio, the preset value used as a reference or a criterion for checking the change of the total erase count to be monitored may be adjusted (S16). When the number of memory blocks on which erase operations have been performed is substantially less that the total number of erase operations performed on the plurality of memory blocks, it may be possible to recognize which memory blocks the erase operation have been performed on frequently. However, if there are no or little deviations between erase counts regarding the plurality of memory blocks during an operating period, it may be difficult or not useful to determine characteristics or attributes of data stored in a memory block. Therefore, to avoid unnecessary operations, the operating period can be adjusted (e.g., extended) by changing the preset value regarding the total erase count.

Adjusting the preset value which is compared with the change of the total erase count can adjust or extend the operating period. The operating period may be determined based on an erase count which is changed according to the operation performed on each memory block (S18). After adjusting the preset value, the operating period can be extended so that the memory system can perform more read, program, erase operations, etc. on a plurality of memory blocks in the memory device until the change of the total erase count reaches the adjusted preset value. While more read, program, erase operations, etc. are performed in a plurality of memory blocks in the memory device, the controller may control, update, or generate information parameters, and the like, regarding the plurality of memory blocks in the memory device. When a read, a program, an erase operation, or the like is performed and the change of the total erase count reaches the adjusted change amount reference, the operating period may be determined to have elapsed.

When the operating period is determined to have elapsed, a data attribute of hot or cold may be determined on a block-by-block basis regarding each of a plurality of blocks in the memory device. For example, the operating period may be determined based on the erase count corresponding to an erase operation, but the data attribute may be determined based on the read count corresponding to a read operation. After the operating period is determined, it may be determined whether an attribute of data stored in the memory block is hot or cold based on the change of the read count for each memory block, which corresponds to operations performed during the operating period.

Figure 5:
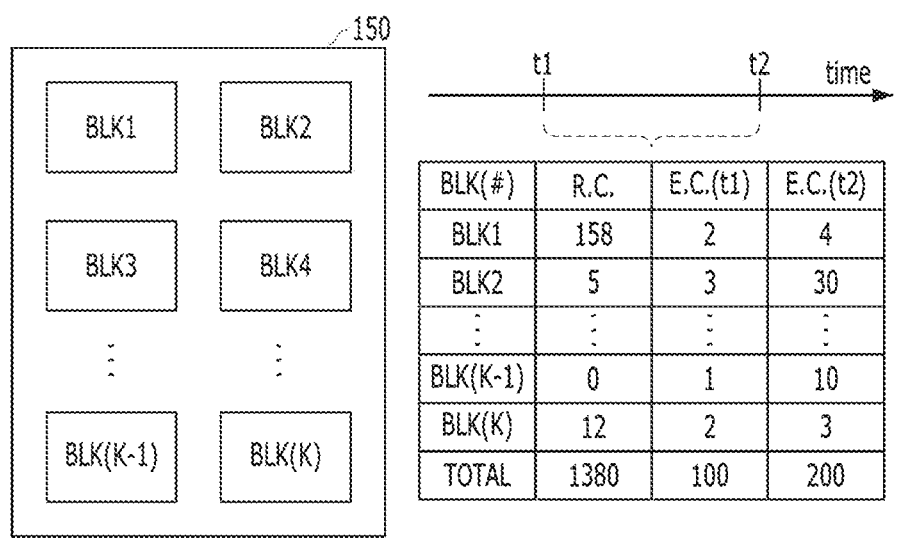
FIG. 5 illustrate a process for determining attributes of memory blocks in a memory system according to an embodiment of the disclosure.

FIG. 5 illustrates a process for determining attributes of a plurality of memory blocks in a memory system according to an embodiment of the disclosure.

Referring to FIG. 5, the memory device 150 may include a plurality of memory blocks BLK1, BLK2, BLK3, BLK4, . . . , BLK(K-1), BLK(K). The operational states of the plurality of memory blocks BLK1, BLK2, BLK3, BLK4, . . . , BLK (K-1), BLK (K) in the memory device 150 may be recognized through parameters or operation information such as a read count (RC), an erase count (EC), or the like.

At a first timing point t1, the erase count EC for each of the plurality of memory blocks BLK1, BLK2, BLK3, BLK4, . . . , BLK(K-1), BLK(K) included in the memory device 150 may be used. In the example of FIG. 5, the sum of the erase counts EC(t1) is 100 at the first timing point t1. After the first timing point t1, plural read, program, and erase operations are performed on the plurality of memory blocks BLK1, BLK2, BLK3, BLK4, . . . , BLK(K-1), BLK(K) in the memory device 150. The controller updates information parameters such as the read count (RC) or the erase count (EC) in response to the read, program or erase operations, etc. performed on a plurality of memory blocks BLK1, BLK2, BLK3, BLK4, . . . , BLK(K-1), BLK(K).

At a second timing point t2, the erase counts EC regarding the plurality of memory blocks BLK1, BLK2, BLK3, BLK4, . . . , BLK(K-1), BLK(K) included in the memory device 150 may be used to determine whether the sum of the erase counts EC(t2) has reached 200. Read, program, erase operations, and the like have been performed on a plurality of memory blocks BLK1, BLK2, BLK3, BLK4, . . . , BLK(K-1), BLK(K) included in the memory device 150, from the first timing point t1 to the second timing point t2. In response to the read, program, erase operations, and the like that have been performed between the first timing point t1 and the second timing point t2, the total of the erase counts EC has been changed from 100 to 200 (the change is 100). In response to the change with respect to the sum of the erase counts E.C. reaching a preset value (e.g., 100), the controller determines that the operating period that started at the first timing point t1 may have ended at the second timing point t2.

The read count RC may be initialized at the first timing point t1 for each of the plurality of memory blocks BLK1, BLK2, BLK3, BLK4, . . . , BLK(K-1), BLK (K) included in the memory device 150. At the second timing point t2, the read counts RC for each of the plurality of memory blocks BLK1, BLK2, BLK3, BLK4, . . . , BLK(K-1), BLK (K) may be different from each other. For example, a read count of the first block BLK1 may be 158, and a read count of the second block BLK2 may be 5. During the operating period from the first timing point t1 to the second timing point t2, the change of the read counts RC for each of the plurality of memory blocks BLK1, BLK2, BLK3, BLK4, . . . , BLK(K-1), BLK(K) included in the memory device 150 may be 1380.

According to an embodiment, when the change of the read count R.C. exceeds a preset threshold (e.g., 100) and the operating period is determined to have ended, data stored in the corresponding memory block may be classified as hot data. Referring to FIG. 5, since the read count R.C. of the first block BLK1 is 158, the attribute of data stored in the first block BLK1 may be determined as hot. But, when the change of the read count R.C. does not exceed the preset threshold (e.g., 100), data stored in the corresponding memory block may be classified as cold data. Referring to FIG. 5, since the read count R.C. of the second block BLK2 is 5, the attribute of data stored in the second block BLK2 may be determined as cold.

According to an embodiment, there may be a plurality of preset thresholds for classifying the data. For example, if the change of the read count R.C. is greater than a first value (e.g., 100) in the operating period, data stored in the corresponding memory block may be classified as hot data. In addition, when the change of the read count R.C. is smaller than a second value (e.g., 10), data stored in the corresponding memory block may be classified as cold data. In addition, when the change of the read count R.C. falls between the first value (e.g., 100) and the second value (e.g., 10), data stored in the corresponding memory block may be classified as warm data. In this case, an attribute of data stored in the plurality of memory blocks BLK1, BLK2, BLK3, BLK4, . . . , BLK(K-1), BLK(K) included in the memory device 150 from the first timing point t1 to the second timing point t2, which are an operation period, can be determined based on the read count RC for each memory block. The attribute of data stored in the first block BLK1 may be determined to be hot, the attribute of data stored in the second block BLK2 may be determined to be cold, and the attribute of data stored in the Kth block BLK(K) may be determined to be a warm.

Although not shown, when the number of erased memory blocks having a changed erase count EC among the plurality of memory blocks BLK1, BLK2, BLK3, BLK4, . . . , BLK(K-1), BLK(K) included in the memory device 150 from the first time point t1 to the second time point t2 is greater than or equal to a preset value, the operating period may not be determined to have ended at the second timing point t2 and the operating period may be extended. For example, when the total of erase counts EC for each of the plurality of memory blocks BLK1, BLK2, BLK3, BLK4, . . . , BLK(K-1), BLK(K) included in the memory device 150 reaches 300, the operating period may be determined to have ended.

Figure 6:
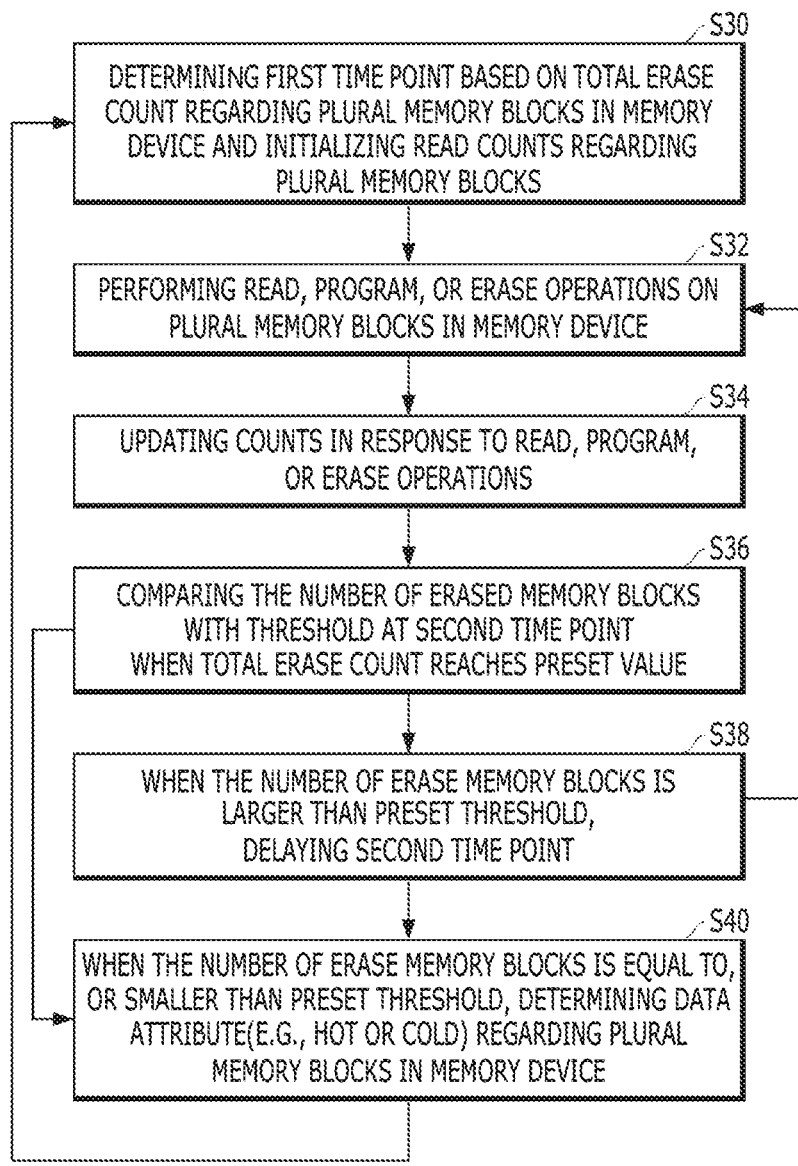
FIG. 6 illustrate a second process of a memory system according to an embodiment of the disclosure.

FIG. 6 illustrate a second process 600 of a memory system according to an embodiment of the disclosure. The second process 600 may specifically describe a process for determining an operation period and determining a data attribute (e.g., hot/cold).

Referring to FIG. 6, the second process 600 may include determining a first time point based on a total erase count regarding a plurality of memory blocks in a memory device and initializing read counts regarding each of the plurality of memory blocks (S30), performing read, program, or erase operations on the plurality of memory blocks in the memory device (S32), updating counts in response to the read, program, or erase operations performed on the plurality of memory blocks (S34), comparing the number of erased memory blocks with a preset threshold at a second time point when the total erase count reaches a preset value, delaying the second time point when the number of erase memory blocks is larger than the preset threshold (S38), and determining data attributes (e.g., hot or cold) regarding the plurality of memory blocks in the memory device when the number of erased memory blocks is equal to, or smaller than, the preset threshold (S40).

The step for initializing read counts regarding the plural memory blocks (S30) may be performed at the first time point t1 described with reference to FIG. 5. For example, the first time point t1 may be a time when the memory device is beginning being used. When the memory device has been already operating, a time point corresponding to a specific condition may be determined as the first time point t1. That is, a period before the first time point t1 may be a previous operating period, and the first time point t1 may be considered a start of new operating period. When the start of new operating period is determined, the read counts for the plurality of memory blocks may be initialized (or reset).

After the start of the operating period is determined, operations for reading data, programming data, or erasing data on the plurality of memory blocks in the memory device may be performed (S32). In response to an operation performed on one of the plurality of memory blocks in the memory device, information corresponding to that memory block (such as state information, operation information, or an information parameter) may be updated (S34). For example, when an operation for reading data stored in a specific memory block is performed, the read count of that specific memory block may be increased. When data stored in a specific memory block is erased, an erase count of that specific memory block may be increased.

After the state information, the operation information or the information parameter is updated in response to operations performed on the plural memory blocks, it may be monitored to determine whether the total erase count regarding the plurality of memory blocks has been increased by the preset value (S36). When a change of the total erase count regarding the plurality of memory blocks has not reached the preset value, the memory system may not determine an attribute of data stored in a memory block, and additional read, program or erase operations may be performed on the plurality of memory blocks in the memory device (S32). When the change of the total erase count regarding the plurality of memory blocks is increased by the preset value, the second time point may be determined so that the number of memory blocks on which the erase operation has been performed may be compared with a preset threshold as a reference for determining an operating period.

By comparing the number of memory blocks on which the erase operation was performed during the operating period with a preset threshold or a reference range, it may be determined whether the number of memory blocks on which the erase operation is performed is larger than the preset threshold or the reference range. When the number of erased memory blocks is larger than the preset threshold, the second time point may be delayed to extend the operating period (S38). When the second time point is delayed, the memory system performs read, program, and erase operations on the plurality of memory blocks in the memory device (S32). For example, when the change of the total erase count is 100, it may be determined that 100 erase operations have been performed on the plurality of memory blocks during the operating period. When the 100 erase operations are performed in 90 or 95 memory blocks (i.e., more than a preset threshold), it may be presumed that plural pieces of data stored in the 90 or 95 memory blocks have been sequentially erased during the operating period. Because most of the erase operations were spread evenly across the 90 or 95 memory blocks (with 10 or 5 erase operations, respectively, being to a memory block that was previously erased in the operating period), it is difficult to determine whether a specific memory block has heavier wear-out than other memory blocks, and therefore difficult to accurately determine whether a wear leveling operation for the plurality of memory blocks is necessary. In this case, it might be useful to check or determine a difference in wear-out (i.e., a difference in number of erase operation) between memory blocks after the memory system performs further read, program, or erase operations on the plurality of memory blocks, which may be accomplished by increasing the preset value compared with the change of the total erase count. For example, the read, program, and erase operations may be further performed on the plural memory blocks in the memory device until the change of the total erase count reaches 200, which is greater than 100 (that is, the operating period is extended).

When the number of erased memory blocks is less than the preset threshold, the memory system can determine an attribute of data stored in a memory block based on a read count of the corresponding memory block (S40). When the number of memory blocks performed by the erase operation is smaller than the preset value (e.g., 30, 40 or 50 memory blocks), it can be presumed that the erase operations were more likely to be performed on a few memory blocks relative to the other memory blocks. That is, a difference in wear-out between memory blocks in the plurality of memory blocks occurs. In this case, the attribute of data stored in each memory block (such as whether the data is hot or cold) may be determined based on the respective read count which was updated in response to respective operations for reading data stored in each memory blocks. Although not shown, a wear levelling operation may be performed based on the attribute of data stored in a memory block and a difference in wear-out between memory blocks.

After determining the attribute of data stored in memory blocks, a new operating period can be started, and the respective read counts of the plurality of memory blocks can be initialized with the start of the new operating period (S30).

Referring to FIG. 6, an operating period is from the first time point to the second time point, and the second time point may be dynamically adjusted for determining the operating period. After the operating period is determined, the memory system may determine attributes of data stored in a plurality of memory blocks. FIG. 6 illustrates an embodiment in which a second time point is adjusted or extended based on the number of memory blocks on which erase operations have been performed. However, according to an embodiment, a preset criterion for determining the second time point under a specific condition may be reduced. For example, when the change of the total erase count is 100, it may be determined that the 100 erase operations have been performed 100 times on the plurality of memory blocks. When it can be determined that the 100 erase operations were performed only on 10 or less memory blocks, a few memory blocks may be worn dramatically or quickly. In this case, the second time point at which the 100 erase operations are performed may be not extended, and the preset value for determining a next operating period may be lowered to 70, 50, or etc. instead of 100. If the erase operation is repeatedly performed on very few memory blocks in the operating period, the wear difference between the memory blocks may increase. In this case, the preset value may be lowered so that the operating period may be reduced to perform the wear levelling operation more frequently.

Figure 7:
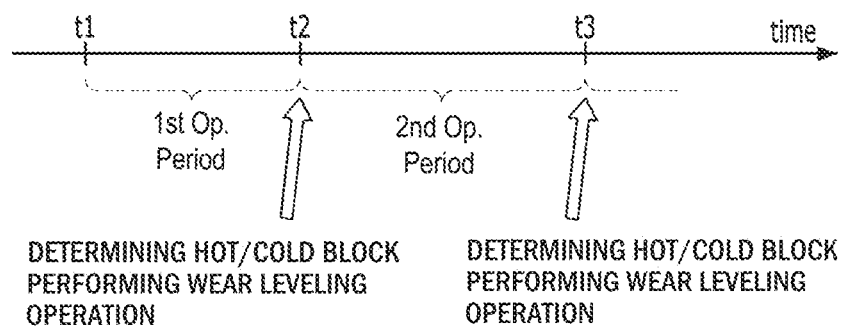
FIG. 7 illustrates an example of an increased operating period for determining an attribute of data stored in a memory block.

FIG. 7 illustrates an example of an increased operating period for determining an attribute of data stored in a memory block.

Referring to FIG. 7, an attribute of data stored in a plurality of memory blocks can be determined based on operation information, state information, an information parameter, or etc. which is determined according to operations performed during a first operating period from a first time point t1 to a second time point t2. For example, it can be determined whether the attribute of data is hot or cold. Also, a wear levelling operation may be performed based on the data attribute.

According to an embodiment, the wear levelling operation may be implemented by storing cold data (data having a cold attribute) in a heavily worn memory block and storing hot data (data having a hot attribute) in a slightly worn memory block. By way of example but not limitation, the wear levelling operation can include allocating a first memory block previously storing data which was determined to have the hot attribute for programming another data which is determined to have a cold attribute, after the first memory block is erased. Further, the wear levelling operation can include allocating a second memory block previously storing data which is determined to have the cold attribute for programming another data which is determined to have a hot attribute, after the second memory block is erased.

After the first operation period is determined and the attributes of data stored in the plural memory blocks are determined, a new operating period (a second operating period) may be started. The second operation period from the second time point t2 to a third time point t3 may be longer than the first operating period from the first time point t1 to the second time point t2. In particular, as described with reference to FIG. 6, when the third time point t3 at which the second operation period is determined can be extended based on the number of memory blocks in which the erase operation is performed in the memory device, the second operating period may be longer than the first operating period.

When the second operating period is determined, like the first operating period, the memory system can determine the attribute of data (e.g., hot/cold) during the second operation period based on operation information, state information, an information parameter, etc. regarding the plurality of memory blocks, which is updated or controlled during the second operating period. Also, a wear levelling operation may be performed based on a result of an analysis of the attribute of data.

Figure 8:
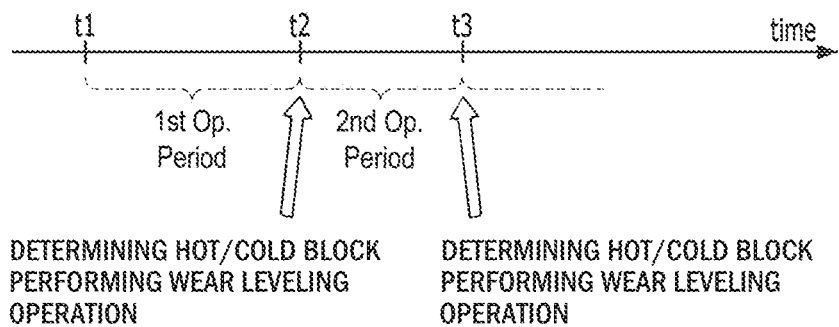
FIG. 8 illustrates an example of a decreased operating period for determining an attribute of data stored in a memory block.

FIG. 8 illustrates an example of decreased operating period for determining an attribute of data stored in a memory block.

Referring to FIG. 8, the memory system can determine an attribute (e.g., hot or cold) of data stored in a plurality of memory blocks based on operation information, state information, an information parameter, etc., which is updated or controlled according to operations performed during a first operating period from a first time point t1 to a second time point t2. Also, a wear levelling operation may be performed in response to a result of an analysis of the data attribute.

Meanwhile, the number of erase operations performed in the first operation period, i.e., from the first time point t1 to the second time point t2, may have been repeatedly performed on a few memory blocks (e.g., a preset number or less of memory blocks). In this case, the wear levelling operation can be performed based on the attributes of data stored in the plural memory blocks, which is determined after the first operating period is determined. A preset criterion for determining a second operating period starting from the second time point t2 is lowered, so that a third time point t3 can be adjusted to reduce the second operating period. Such an operation may reduce a difference in wear-out between memory blocks when operations in the memory device are performed such that the difference in wear between memory blocks is rapidly increased.

Referring to FIGS. 7 and 8, based on operations performed on a plurality of memory blocks in a memory device, a time point, a reference, or etc. for determining an attribute of data stored in a memory block of the plurality of memory blocks may be dynamically changed or determined. Thus, the attribute of data stored in the memory block can be dynamically determined based on a data usage pattern of a user who uses the memory device and the memory system, thereby improving a lifespan and operational stability of the memory system.

FIG. 9 illustrates a threshold or a criterion for determining whether an attribute of data stored in a memory block is hot or cold, according to an embodiment of the disclosure. FIGS. 7 to 8 illustrate that an operating period for determining attributes and characteristics of data stored in a plurality of memory blocks BLK1, BLK2, BLK3, BLK4, . . . , BLK(K-1), BLK(K) may be changed. FIG. 9 illustrates an example of a change of read counts RC in an operating period.

Referring to FIG. 9, regarding a change in the read counts RC for each of the plurality of memory blocks BLK1, BLK2, BLK3, BLK4, . . . , BLK(K-1), BLK(K) included in the memory device, two different illustrative cases ($1^{st}$ case, $2^{nd}$ case) will be described. The two different cases ($1^{st}$ case and $2^{nd}$ case) may occur in two operating periods of substantially the same duration, or may occur in two operating periods of different durations.

First, in a first case, the sum of the change of the read counts RC for each of the plurality of memory blocks BLK1, BLK2, BLK3, BLK4, . . . , BLK(K-1), BLK(K) is 1380. In this case, data stored in the first block BLK1 having a change of the read count R.C. over a preset reference or a preset value (e.g., 100) may be determined to be hot data.

On the other hand, in a second case, the total change of the read counts RC for each of the plurality of memory blocks BLK1, BLK2, BLK3, BLK4, . . . , BLK(K-1), BLK(K) is 2580. In this case, data stored in the first block BLK1 may be determined to be cold data even though the first block BLK1 has a change of the read count RC exceeding the preset reference or the preset value (e.g., 100). However, data stored in the (K-1)th block BLK(K-1) having a change of the read count R.C., i.e., 260, may be determined to be hot.

In both the first case and the second case, the amount of change in the read count R.C. for the first block BLK1 is equal to 158. However, total changes of the read counts R.C. for each of the plurality of memory blocks BLK1, BLK2, BLK3, BLK4, . . . , BLK(K-1), BLK(K) in the first case and the second case are 1380 and 2580, respectively, which are very different. Herein, a preset ratio (e.g., 10%) based on the total change of the read count (RC), not a preset fixed value or a preset reference (e.g., 100), may be used as a criterion or a reference for determining the attribute of data stored in a specific memory block as hot or cold. For example, a criterion for distinguishing hot/cold data from each other in the first case may be 138, which is 10% of 1380, and a criterion for distinguishing hot/cold data in the second case may be 258, which is 10% of 2580. By determining a criterion for determining attributes of data according to a ratio according to the total change in the read counts R.C. of the plurality of memory blocks, an attribute of data stored in a memory block may be determined based on a deviation of a number of operations performed between the respective memory blocks. In this manner, even in the case of data stored in the first block BLK1 having the same change of read count in both the first and second cases, an attribute of data stored in the first block BLK1 may be determined differently as hot or cold based on the total change of read counts R.C. regarding the plurality of memory blocks.

As described with reference to FIG. 9, a criterion or a reference for determining a data attribute can be varied based on a number of operations performed on each of a plurality of memory blocks BLK1, BLK2, BLK3, BLK4, . . . , BLK(K-1), BLK(K) included in the memory device. Based on a dynamic change of the criterion or the reference, the characteristics and attributes of data can be more effectively or accurately determined according to operations performed in the operating period.

According to embodiments of the disclosure, a memory system, a data processing system and a method of operating the memory system or the data processing system may dynamically determine a threshold or a criterion for performing a wear leveling operation based on user's data usage pattern, so as to improve or enhance a lifespan of the memory system or the data processing system. In particular, embodiments dynamically vary the duration of an operation period over which information used to control the wear leveling operation is collected.

In addition, embodiments of the disclosure have the advantage of improving data safety in a memory system by monitoring parameters regarding a plurality of memory blocks and performing a read reclaim operation and a wear leveling operation based on the parameters.

While the present teachings have been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system, comprising:
    a memory device including a plurality of memory blocks capable of storing data; and
    a controller configured to determine an attribute of data stored in a memory block during an operating period,
    wherein a duration of the operating period is changeable based on parameter information regarding the plurality of memory blocks, and
    wherein the controller is configured to determine the attribute of the data stored in the memory block based on a change of a read count included in the parameter information regarding the memory block.

2. The memory system according to claim 1, wherein the controller is configured to perform a wear levelling operation on the plurality of memory blocks based on the attribute of the data stored in the memory block.

3. The memory system according to claim 2, wherein the controller is configured to:
    in response to a first memory block among the plurality of memory blocks previously storing data which was determined to have a hot attribute, allocate the first memory block for programming with another data which is determined to have a cold attribute after the first memory block is erased, and
    in response to a second memory block among the plurality of memory blocks previously storing data which was determined to have a cold attribute, allocate the second memory block for programming with another data which is determined to have a hot attribute after the second memory block is erased.

4. The memory system according to claim 2, wherein the controller is configured to:
    determine the attribute of the data stored in each memory block; and
    estimate a data usage pattern through associating the attribute of the data stored in the memory block with a logical address regarding a piece of data stored in the memory block.

5. The memory system according to claim 4, wherein the controller is configured to determine which memory block is allocated for newly programming a piece of data associated with the logical address based on the data usage pattern.

6. The memory system according to claim 1, wherein the controller is configured to adjust a threshold for determining the attribute of the data stored in the memory block based on a total of changes of read counts regarding the plurality of memory blocks.

7. A memory system, comprising:
    a memory device including a plurality of memory blocks capable of storing data; and a controller configured to determine an attribute of data stored in a memory block during an operating period,
wherein a duration of the operating period is changeable based on parameter information regarding the plurality of memory blocks, and
wherein the controller is configured to:
   determine a ratio of memory blocks having a changed erase count among the plural memory blocks in response to a change of a total erase count reaching a preset value,
   adjust the preset value based on the ratio, and
   determine the duration of the operating period based on the preset value.

8. The memory system according to claim 7, wherein the controller is configured to increase the preset value when the ratio is in a first range.

9. The memory system according to claim 7, wherein the controller is configured to decrease the preset value when the ratio is in a second range.

10. The memory system of claim 7, wherein the controller is configured to perform a wear levelling operation on the plurality of memory blocks based on the attribute of the data stored in the memory block.

11. A method for operating a memory system, comprising:
   performing, on a memory block among a plurality of memory blocks, at least one operation of a program operation, a read operation, or an erase operation;
   updating a first parameter regarding the plurality of memory blocks and a second parameter regarding the memory block in response to the at least one operation performed on the memory block;
   determining an operating period based on the first parameter and the second parameter; and
   determining an attribute of data stored in the memory block during the operating period based on the second parameter,
   wherein determining the attribute of the data includes determining the attribute of the data stored in the memory block based on a change of a read count included in the second parameter regarding the memory block.

12. The method according to claim 11, further comprising:
   performing a wear levelling operation on the plurality of memory blocks based on the attribute of the data stored in the memory block.

13. The method according to claim 12, wherein the wear levelling operation includes:
   when a first memory block among the plurality of memory blocks is determined to have previously stored data which was determined to have a hot attribute, allocating the first memory block for programming with another data which is determined to have a cold attribute after the first memory block is erased, and
   when a second memory block among the plurality of memory blocks is determined to have previously stored data which was determined to have a cold attribute, allocating the second memory block for programming with another data which is determined to have a hot attribute after the second memory block is erased.

14. The method according to claim 12, wherein the attribute of the data is determined in each memory block, and the method further comprises estimating a data usage pattern through associating the attribute of the data stored in the memory block with a logical address regarding a piece of data stored in the memory block.

15. The method according to claim 14, further comprising:
   determining, based on the data usage pattern, which memory block is allocated for newly programming a piece of data associated with the logical address.

16. The method according to claim 11, wherein determining the attribute of the data further includes:
   adjusting a threshold for determining the attribute of data stored in the memory block based on a total of changes of read counts regarding the plurality of memory blocks.

17. A method for operating a memory system, comprising:
   performing, on a memory block among a plurality of memory blocks, at least one operation of a program operation, a read operation, or an erase operation;
   updating a first parameter regarding the plurality of memory blocks and a second parameter regarding the memory block in response to the at least one operation performed on the memory block;
   determining an operating period based on the first parameter and the second parameter;
   determining an attribute of data stored in the memory block during the operating period based on the second parameter;
   determining a ratio of memory blocks having a changed erase count among the plurality of memory blocks when a change of a total erase count reaches a preset value;
   adjusting the preset value based on the ratio; and
   determining the operating period based on the preset value.

18. The method according to claim 17, wherein the preset value is increased when the ratio is in a first range.

19. The method according to claim 17, wherein the preset value is decreased when the ratio is in a second range.

20. The method of claim 17, further comprising performing a wear levelling operation on the plurality of memory blocks based on the attribute of the data stored in the memory block.

* * * * *